Sept. 27, 1955     A. ZICHICHI     2,718,853
DOUGH CUTTING AND CRIMPING DEVICE
Filed July 1, 1952

Inventor
Anthony Zichichi

United States Patent Office 2,718,853
Patented Sept. 27, 1955

2,718,853
DOUGH CUTTING AND CRIMPING DEVICE
Anthony Zichichi, Chicago, Ill.

Application July 1, 1952, Serial No. 296,575

1 Claim. (Cl. 107—47)

This invention relates to a dough cutting and crimping device and more particularly to a device for efficiently cutting and crimping dough such as ravioli dough in a single operation.

In making ravioli it has been the practice to place one layer of dough on a flat working surface, distribute small quantities of force meat in rows over the layer of dough, place the upper layer of dough thereover, cut into squares and then crimp the edges of the individual squares by manually pinching the edges. The primary purpose of this invention is to provide a device which will both cut and crimp ravioli dough in a single operation. Although such is the primary purpose, it will be seen that the device of this invention has somewhat general application to the cutting and crimping or decorating of many types of dough.

According to this invention, a dough cutting and crimping device comprises a wheel having a peripheral cutting edge with crimping means closely spaced radially inwardly from the cutting edge a distance less than the thickness of the dough to be cut and crimped. With this spacing, the crimping means must engage and act on the dough, but at the same time, the crimping means is prevented from going completely through the dough since the crimping means is held in spaced relation to the supporting surface by the cutting edge. The crimping means should, of course, be on both sides of the wheel so that the dough will be crimped on both sides in one operation. In a preferred form, the crimping means comprises circumferentially spaced portions integral with the wheel and projecting axially from both sides thereof. The wheel may be held by any desired means preferably between two arms affixed to a handle.

Although the device of this invention is particularly and peculiarly advantageous in cutting and crimping ravioli dough, it has somewhat general application. For example, the device might be used as a cookie cutter with the crimping structure serving to decorate the edges of the cookies.

An object of this invention, accordingly, is to provide an efficient device for both cutting and crimping ravioli dough in a single operation.

Another object of this invention is to provide a device for both cutting and decorating dough in a single operation.

This invention contemplates other objects, features and advantages which will become more fully apparent from the following detailed description taken in conjunction with the accompanying drawing which illustrates the preferred embodiment and in which.

As shown on the drawing.

Figure 1:
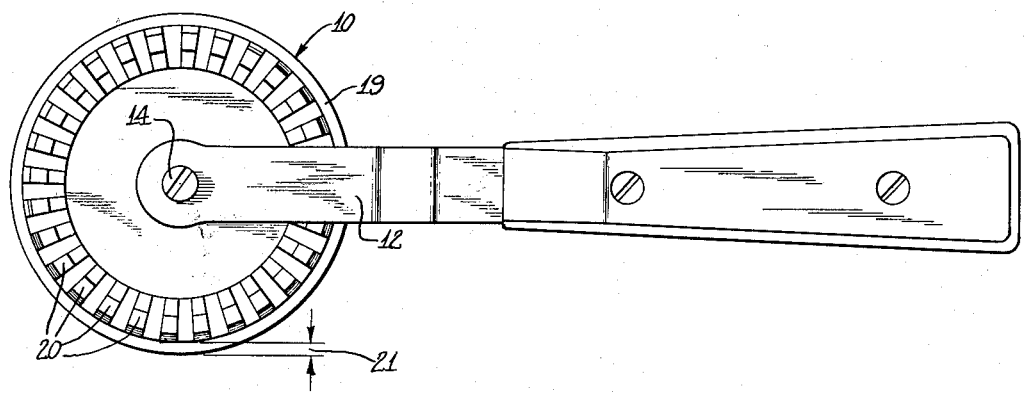
Figure 1 is a side view of a dough cutting and crimping device constructed according to this invention.
Figure 2:
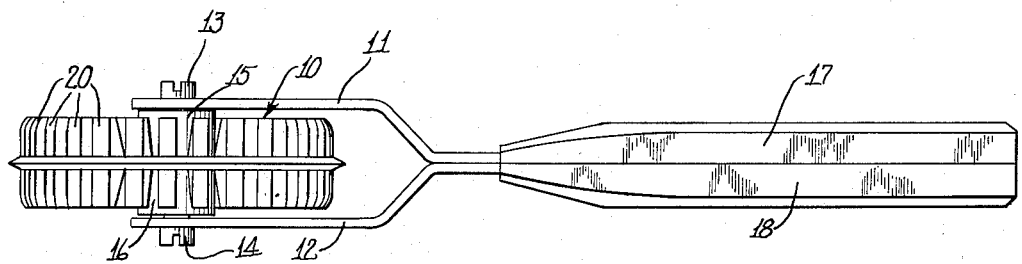
Figure 2 is a front view of the device of Figure 1.

The device of this invention includes a wheel 10 disposed between the ends of a pair of arms 11 and 12 with screws 13 and 14 threaded through the arms 11 and 12, respectively, and into integral hub portions 15 and 16, respectively, of the wheel 10 to rotatably support the same. The other ends of the arms 11 and 12 may preferably be secured together between a pair of wooden handle portions 17 and 18.

The wheel 10 has a peripheral dough-cutting edge 19 which may be either straight as illustrated or, if desired, might be corrugated so as to produce an ornamental cut. Crimping means are disposed on both sides of the wheel 10 and spaced radially inwardly from the cutting edge 19 a distance less than the thickness of the dough to be crimped so as to insure crimping of the dough without allowing the crimping means to pass through the dough. The crimping means is preferably in the form of integral portions 20 spaced around the wheel 10 and projecting axially from both sides thereof. The projections 20 are radially inwardly spaced from the cutting edge 19 a distance as indicated by reference numeral 21 which should be less than the thickness of the dough to be cut and crimped. The distance 21 should normally be between 1/16 and 3/16 inch when the device is used for cutting and crimping ravioli. Preferably, the outwardly facing surfaces of the projections 20 may be tapered as illustrated so that the device will efficiently accommodate doughs of various thicknesses.

It will be understood, of course, that the crimpers 20 may be of various forms and may be designed to produce an ornamental appearance in addition to crimping of the dough or may be used solely for the purpose of producing an ornamental appearance as when, for example, the device is used for cutting cookies.

Figure 3:
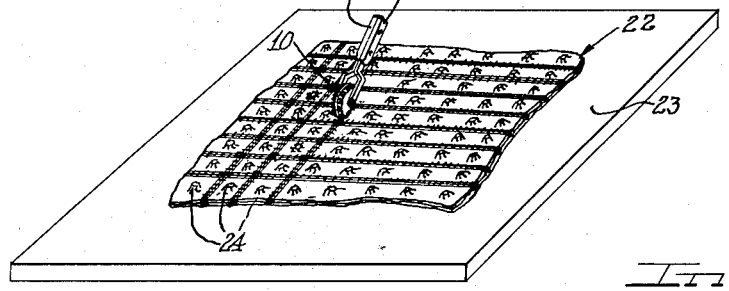
Figure 3 is a perspective view illustrating a preferred manner of using the device of Figure 1.

Figure 3 illustrates the device as used in cutting and crimping two layers of ravioli dough designated by reference numeral 22 and disposed on a flat work surface 23, portions of the forcemeat being disposed in rows between the layers of dough 22 at points 24. In this view the device of this invention has been passed between the rows of meat in one direction and is being passed between rows in the opposite direction. The edge 19 cuts the dough and the projections 20 crimp the dough in a single operation with the edge 19 serving to hold the projections 20 in properly spaced relation to the work surface 23.

Other modifications and variations may, of course, be effected without departing from the spirit and scope of the novel concepts of the present invention.

I claim as my invention:

An improved ravioli cutter for cutting and crimping the edges of ravioli sections from two superimposed layers of dough between which is sandwiched spaced rows of forcemeat, comprising, a rotatable wheel having a hub, a handle journalled to said hub to manipulate said cutter with the axis of rotation of said wheel in spaced parallel relation to the layers of dough, said wheel having a web extending radially outwardly of said hub and terminating in an annular peripheral circumferentially continuous knife edge disposed in a plane normal to the axis of rotation of said wheel, said wheel further including transversely extending projections on opposite sides of said web adjacent said knife edge forming dough engaging surfaces disposed on a generally transverse plane relative to said web and being spaced radially inwardly of said knife edge, said projections being circumferentially spaced to alternate a plurality of shoulder portions with a corresponding plurality of recessed portions therebetween, said wheel being rotatably movable between the rows of forcemeat, whereupon said knife edge will cut through the layers of dough and said projections will crimp the dough on both sides of the knife edge and force the layers of dough into firm contact with one another at corrugated edge portions of the ravioli sections.

References Cited in the file of this patent

UNITED STATES PATENTS

| Number | Name | Date |
|---|---|---|
| 1,377,974 | Simpson | May 10, 1921 |
| 1,530,278 | Minneman | Mar. 17, 1925 |
| 1,535,300 | Forster | Apr. 28, 1925 |
| 1,695,427 | Helfgott | Dec. 18, 1928 |
| 2,041,240 | Gluesing | May 19, 1936 |
| 2,075,157 | Alberti | Mar. 30, 1937 |

FOREIGN PATENTS

| 416,605 | Italy | Dec. 5, 1946 |